(12) United States Patent
Schaade

(10) Patent No.: US 8,843,658 B2
(45) Date of Patent: Sep. 23, 2014

(54) METHOD, COMMUNICATION SYSTEM, AND COMMUNICATION TERMINAL FOR THE TRANSMISSION OF DATA

(75) Inventor: Stephan Schaade, Buchloe (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 751 days.

(21) Appl. No.: 12/223,755

(22) PCT Filed: Jan. 24, 2007

(86) PCT No.: PCT/EP2007/050697
§ 371 (c)(1),
(2), (4) Date: Aug. 7, 2008

(87) PCT Pub. No.: WO2007/090742
PCT Pub. Date: Aug. 16, 2007

(65) Prior Publication Data
US 2009/0031043 A1    Jan. 29, 2009

(30) Foreign Application Priority Data
Feb. 9, 2006   (DE) .......................... 10 2006 006 073

(51) Int. Cl.
G06F 15/16 (2006.01)
H04L 12/58 (2006.01)
H04Q 3/72 (2006.01)
H04M 3/42 (2006.01)
H04M 3/48 (2006.01)
H04M 1/57 (2006.01)
H04M 7/00 (2006.01)

(52) U.S. Cl.
CPC .................. H04Q 3/72 (2013.01); H04L 12/58 (2013.01); H04M 1/57 (2013.01); H04Q 2213/13103 (2013.01); H04M 7/0015 (2013.01); H04M 7/0054 (2013.01); H04Q 2213/13152 (2013.01); H04Q 2213/13375 (2013.01); H04Q 2213/13173 (2013.01); H04L 51/04 (2013.01); H04M 2203/551 (2013.01); H04Q 2213/13091 (2013.01); H04Q 2213/13097 (2013.01); H04M 3/42195 (2013.01); H04M 3/48 (2013.01); H04L 12/581 (2013.01)
USPC ............ 709/245; 709/206; 709/207; 709/246

(58) Field of Classification Search
USPC .................................. 709/245, 246, 204–207
See application file for complete search history.

(56) References Cited

U.S. PATENT DOCUMENTS 6,018,761 A *  1/2000  Uomini ......................... 709/206
6,298,128 B1 * 10/2001  Ramey et al. ............ 379/142.01
(Continued)

FOREIGN PATENT DOCUMENTS

GB            2362788       11/2001
GB            2376836       12/2002
WO       WO 00/54487 A1    9/2000

*Primary Examiner* — Harunur Rashid
(74) *Attorney, Agent, or Firm* — Buchanan Ingersoll & Rooney PC

(57) ABSTRACT

Disclosed is a method, a communication system, and a communication device for transmitting data to a first subscriber, within the framework of a connection signaling from a first primary service communication device of the first subscriber to a second primary service communication device, a primary address information message associated with the first primary service communication device and a secondary address information message associated with a first secondary service communication device of the first subscriber is transmitted to the second primary service communication device. The transmitted address information messages are identified and stored via the primary service communication device. For the transmission of data to be transmitted to the first subscriber, the stored secondary address information message is transferred from the second primary service communication device to a second secondary service communication device, and is transmitted based on the transferred secondary address information message during transmission to the first secondary service communication device.

18 Claims, 2 Drawing Sheets

(56) References Cited

U.S. PATENT DOCUMENTS

| | | | |
|---|---|---|---|
| 6,788,769 B1 * | 9/2004 | Waites | 379/93.24 |
| 6,985,494 B2 * | 1/2006 | Thompson | 370/466 |
| 2002/0028665 A1 * | 3/2002 | Mankovitz | 455/186.1 |
| 2004/0202299 A1 * | 10/2004 | Schwartz | 379/142.01 |
| 2006/0293903 A1 * | 12/2006 | Ramanathan et al. | 705/1 |

* cited by examiner

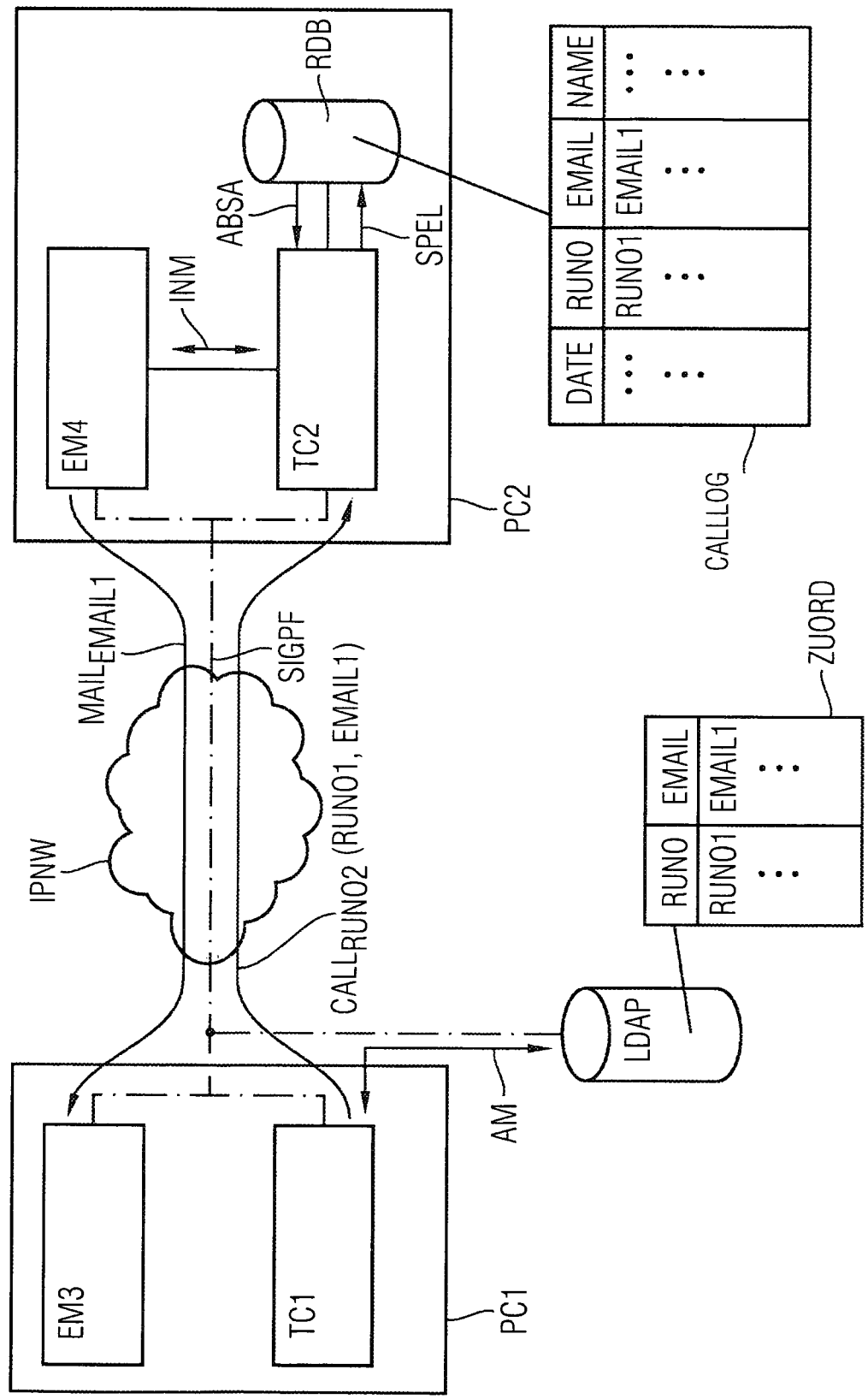

METHOD, COMMUNICATION SYSTEM, AND COMMUNICATION TERMINAL FOR THE TRANSMISSION OF DATA

CROSS REFERENCE TO RELATED APPLICATIONS

This application is the US National Stage of International Application No. PCT/EP2007/050697, filed Jan. 24, 2007 and claims the benefit thereof. The International Application claims the benefits of German application No. 10 2006 006 073.3 filed Feb. 9, 2006, both of the applications are incorporated by reference herein in their entirety.

FIELD OF INVENTION

The invention relates to a method, a communication system, and a communication device for transmitting data within a communication network.

BACKGROUND OF THE INVENTION

In known voice communication systems, when a connection is being set up from a calling communication facility to a called communication facility, a call number of the calling communication facility is often signaled and can be displayed on a display unit of the called communication facility. Voice communication systems of this type are for example ISDN-based exchanges (ISDN: Integrated Services Digital Network) and ISDN telephones, which can be linked by way of these, it being possible for the exchanges to be arranged in the public telephone network or private communication networks belonging to companies or organizations. The transmission and display of incoming call numbers is also standard for mobile radio communication.

Modern communication facilities also frequency allow, in addition to the display on the display unit, terminal-specific storage of transmitted call numbers and further connection data for incoming connections in call logs. Lists of caller call numbers of incoming accepted and/or not accepted calls are frequently stored in such call logs.

When call logs are used, it is generally possible with known communication facilities to use the connection data stored in the call logs to initiate the setting up of a further connection from the called communication facility to the originally calling communication facility. Such setting up of a further connection is generally initiated manually by the called subscriber, by selecting an entry from a call log on the display and by way of an input means on the originally called communication facility, and initiating the setting up of the further connection for this. It is thus possible for a subscriber for example, who identifies that he/she has been called in his/her absence, to call the original caller back in a simple manner.

A further known communication service is an email communication, wherein a subscriber—using an email address for addressing purposes—can transmit a text-based message to a further subscriber. An email address as transmission destination can hereby be taken for example from a previous email traffic, in which the further subscriber took part.

SUMMARY OF INVENTION

The object of the present invention is to specify a method and a communication terminal for the more flexible use of different communication services. A further object is to specify a communication system for implementing the method.

This object is achieved by a method, a communication system and a communication facility as claimed in the claims.

Advantageous embodiments and developments of the invention are set out in the dependent claims.

With the inventive method for transmitting data to a first subscriber a first primary service communication facility for communication by way of a primary communication service and a first secondary communication facility for communication by way of a secondary communication service, which in particular is different from the primary communication service, are assigned to the first subscriber. In the inventive method primary address information is assigned to the first primary service communication facility and secondary address information is assigned to the first secondary service communication facility, whereby, in the context of a connection signaling from the first primary service communication facility to a second primary service communication facility, the primary address information and the secondary address information is transmitted to the second primary service communication facility by means of the primary communication service and the second primary service communication facility identifies the transmitted primary and secondary address information and stores it in an address book with mutual assignment. For the transmission of data to the first subscriber the stored secondary address information is transferred from the second primary service communication facility to a second secondary service communication facility. The data to be transmitted is also transmitted by way of the secondary communication service to the first secondary service communication facility using the transferred secondary address information.

It is a particular advantage of the invention that the secondary address information is transmitted by way of the primary communication service and is thus available at the second primary service communication facility and/or the second secondary service communication facility, without a complex and possibly error prone manual or electronic determination—for example by way of a database or communication directory—being required at the second primary service communication facility and/or the second secondary service communication facility. It also proves to be advantageous that the transmission of data to the first subscriber is permitted by way of the second communication service using the secondary address information, it being possible for the second communication service to be different from the first communication service and/or the secondary address information to be different from the primary address information.

In one advantageous embodiment of the invention the primary communication service can be provided for bidirectional voice, video and/or multimedia communication—preferably based on a line-switched or packet-oriented real-time protocol. Additionally or alternatively the secondary communication service can be provided for unidirectional message transmission by means of text, voice, video and/or multimedia data—in particular based on a protocol for non-real-time communication or based on a protocol for real-time communication with lower real-time requirements. The secondary communication service is preferably email, in particular according to SMTP (Simple Mail Transfer Protocol) or text messaging using a push method, in particular instant messaging, wherein text messages are transmitted for immediate display at a receiver terminal.

In a further advantageous embodiment of the invention the primary address information can also be represented by a call number, an IP address (IP: Internet Protocol), an E.164 number according to ITU-T recommendation (ITU-T: Telecommunication Standardization Sector of the International Telecommunication Union), a URI (Uniform Resource Identifier) of a voice over IP service or an ENUM (ENUM: telephone number mapping) identifier of a voice over IP service. The secondary address information can be represented by an email address or an instant messaging identity. In particular the secondary address information can be address information, which is meaningless in a previous primary communication service and is generally not transmitted.

In an advantageous development of the invention the transfer of the stored secondary address information from the second primary service communication facility to the second secondary service communication facility and/or the transmission of the data to the first secondary service communication facility can be initiated by the detection of a selection of an entry in the address book by the second primary service communication facility or the second secondary service communication facility.

In a further advantageous development of the invention the address book can be configured as a connection schedule, a call log and/or an email address book, with which incoming and outgoing connections can respectively be stored at a communication facility with assignment to a call number of the communication partner. The call log or connection schedule can hereby be limited to connections, which correspond to a specific criterion. This criterion can be for example an adopted state of the connection—e.g. accepted, rejected—the communication direction—e.g. incoming, outgoing—and/or time information—e.g. for listing separately by calendar days. The entries in the address book here can be stored permanently or just temporarily and can be deleted after specified or unspecified time intervals. The address book can also be configured as an email address book or contact list, in which for example an assignment can be made between email addresses and call numbers. Also the address book can be provided in particular by the second primary or second secondary service communication facility or by a server facility.

BRIEF DESCRIPTION OF THE DRAWINGS

An exemplary embodiment of the invention is described in more detail below with reference to the schematic diagrams in a drawing, in which:

FIG. 2 shows a communication system with two terminals respectively comprising a primary and secondary service communication facility, said terminals being linked by way of a data network.

DETAILED DESCRIPTION OF INVENTION

Figure 1:
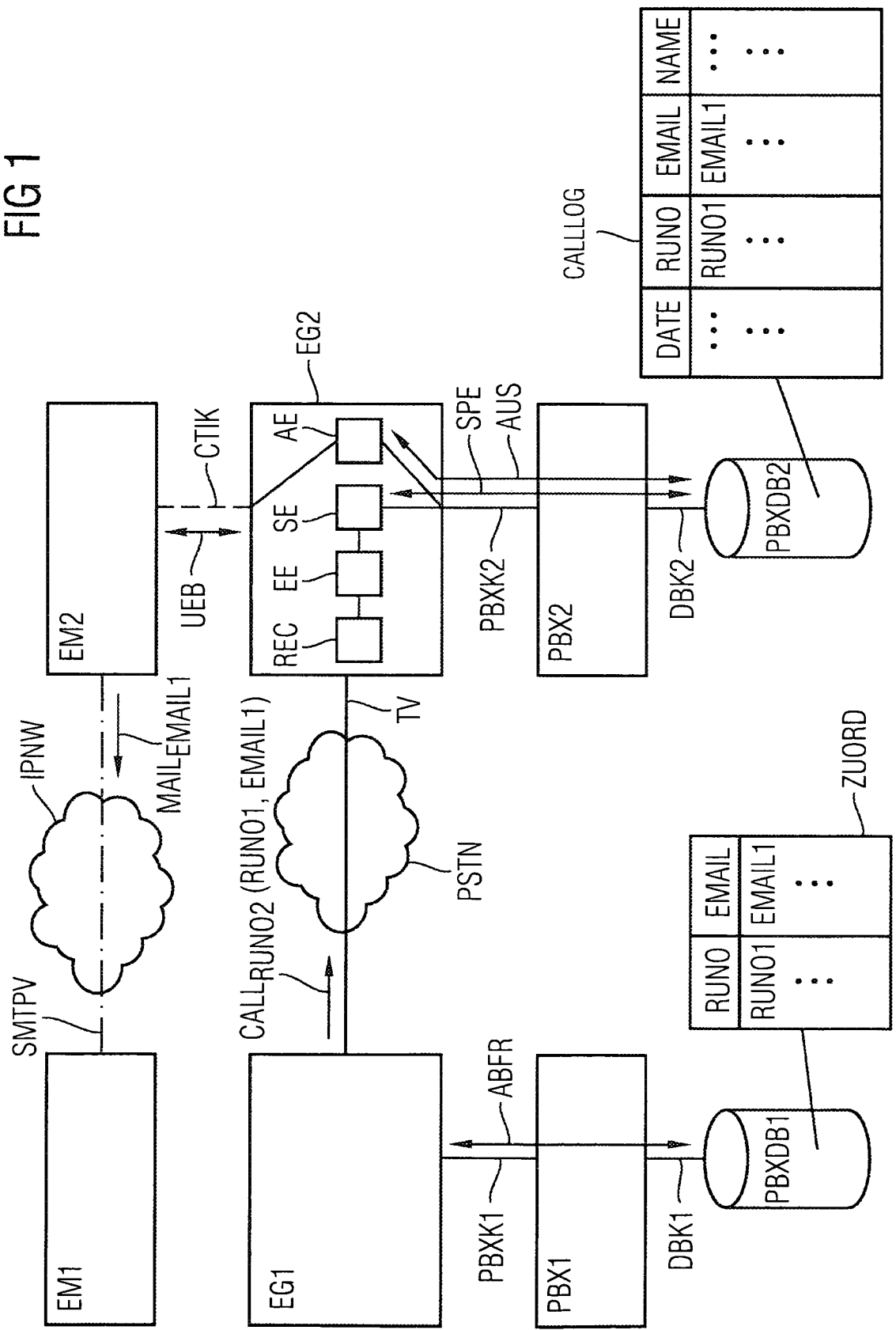
FIG. 1 shows a communication system with two terminals, which are linked by way of a telephone network for voice communication and two further terminals, which are linked by way of a data network for email communication.

FIGS. 1 and 2 respectively show schematic diagrams of a communication system for implementing the inventive method for transmitting data to a first subscriber. In FIG. 1 the first subscriber is assigned a first telephone EG1 as a first primary service communication facility and a first email client EM1 as a first secondary service communication facility. The first telephone EG1 can hereby be linked by way of the telephone network PSTN by way of a primary communication service to further telephones—in particular to a second telephone EG2 as a second primary service communication facility. This second telephone EG2 is assigned to a second subscriber, to whom a second email client EM2 is also assigned as a second secondary service communication facility. In FIG. 1 the said terminals EG1, EM1, EG2, and EM2 are shown as rectangles.

The second subscriber can use the second email client EM2 to set up an email communication in the context of a secondary communication service to the first email client EM1 of the first subscriber by way of a data network IPNW. The link between the two email clients EM1 and EM2 is in particular packet-oriented, preferably using the IP-based SMTP protocol, and is shown as the dot-dash line SMTPV in FIG. 1 for clarity. The link between the first telephone EG1 and the second telephone EG2 is line-oriented in the present exemplary embodiment and is shown by a continuous line TV.

Further components of this exemplary embodiment are a first exchange PBX1 using line-oriented methods to control and administer the first telephone EG1, a first database PBXDB1, which is linked to the first exchange PBX1, a second exchange PBX2 to be linked to the second telephone EG2 and a second database PBXDB2, which is linked to the second exchange PBX2. It should be assumed that the exchanges PBX1, PBX2 and telephones EG1, EG2 communicate with one another by means of an ISDN protocol or an ISDN-based protocol. FIG. 1 shows the exchanges PBX1, PBX2 as rectangles, with the databases PBXDB1, PBXDB2 stylized as cylinders. The link between the first exchange PBX1 and the first telephone EG1 is designated as PBXK1 and between the first exchange PBX1 and the first database PBXDB1 as DBK1, being shown as continuous lines. A similar representation and designations PBXK2 and DBK2 are used between the second telephone EG2 and the second exchange PBX2, as well as on to the second database PBXDB2.

An address transfer unit AE, a receive unit REC, an identification unit EE and a storage control unit SE as components of the second telephone EG2 are also shown schematically as rectangles within the second telephone EG2. The receive unit REC linked to a communication input of the second telephone EG2 hereby in particular carries out the task of receiving incoming connection signaling—for example from the first telephone EG1—with address information transmitted in the context of the connection signaling. The identification unit EE linked to the receive unit REC and the storage control unit SE identifies the address information received by the receive unit REC as primary and secondary address information and transfers it for storage in an address book of the storage control unit SE. The storage control unit SE stores the identified primary and secondary address information in the address book with mutual assignment. The address book is configured in FIG. 1 as a call log CALLLOG provided in the second database PBXDB2, in which all incoming calls are stored. Communication between the storage control unit SE and the second database PBXDB2 takes place in the present exemplary embodiment by way of a control input of the second telephone EG2 by way of the link PBXK2 to the second exchange PBX2 and on by way of the link BDK2 to the second database PBXBD2, it being possible for the control input to be identical to the communication input in alternative embodiments.

If the arrangement of the communication facilities—as shown in FIG. 1—is structured so that the first telephone EG1 and the first email client EM1 are assigned to a source communication system and the second telephone EG2 and the second email client EM2 are assigned to a destination communication system, then the address book is characterized in that it is arranged in the destination communication system, while the first database PBXDB1 is associated with the source communication system.

The address transfer unit AE, like the storage control unit SE, also has a link to the control input of the second telephone EG2. The address transfer unit AE uses this to read out an entry stored in the call log CALLLOG—in particular its secondary address information of the entry—and to transfer it by way of a link to the second email client EM2.

The link between the second telephone EG2 and the second email client EM2 is shown with a broken line by a CTI link CTIK, where CTI stands for Computer Telephony Integration and means for controlling and/or interrogating the second telephone EG2 are provided by a computer application, like the second email client EM2, or by a further communication facility. The underlying CTI communication protocol provided can be for example the CSTA protocol (CSTA: Computer Supported Telephony Application). An optional link between the first telephone EG1 and the first email client EM1 is not significant in the context of the exemplary embodiment and is therefore not shown.

A communication and/or messages in the context of the inventive method are shown in FIG. 1 by single or double arrows. In the exemplary embodiment an assignment table ZUORD, stored in the first database PBXDB1, is also provided for an assignment of call numbers and email addresses of terminals, which are administered by the first exchange PBX1. The assignment table ZUORD is shown in the drawing as a two-column table with the headings RUNO for stored call numbers and EMAIL for stored email addresses. In FIG. 1 the assignment table contains one value pair RUNO1 and EMAIL1, and further value pairs for further subscribers or terminals shown by dots.

FIG. 1 also shows the caller log CALLLOG as a multi-column table. The data for incoming communication stored therein in particular includes the arrival time of the incoming communication (shown as DATE), the call number of the caller of the incoming communication (shown as RUNO), an associated email address (shown as EMAIL) of the subscriber and a transmitted display name of the caller (shown as NAME). The caller log CALLLOG is empty as a possible initial state. The values of the caller log CALLLOG shown in FIG. 1 are values which are only input during the course of the method.

The call numbers shown in the figures as primary address information and the email addresses shown as secondary address information designate addresses for identifying communication facilities and are used to find a destination, for routing purposes and to direct data in a respective communication service. It should be noted in particular here that the email addresses have no significance with respect to addressing in the primary telephony communication service. The email addresses are external addresses of the primary communication service and are not used in this and according to the invention are transmitted without modification by components in the signaling path to the receiving communication facility—in this instance the second telephone EG2.

The initial situation in FIG. 1 is a rest state for all the communication facilities EG1, EG2, EM1, EM2 mentioned above. On this basis the first subscriber initiates an attempted connection to the second telephone EG2 at the first telephone EG1. In the context of this attempted connection the first exchange PBX1 or the first telephone EG1 determines an associated email address EMAIL1—as secondary address information—of the first subscriber for a call number RUNO1—as the primary address information—of the first telephone EG1, by interrogating the assignment table ZUORD in the first database PBXDB1. Such assignment pairs are configured and/or administered in the assignment table ZUORD. If there is an entry in the assignment table ZUORD for the call number RUNO1—as indicated in the present exemplary embodiment by the value pair RUNO1-EMAIL1 shown in the assignment table in FIG. 1—the email address EMAIL1 associated with the call number RUNO1 and determined is transmitted to the first exchange PBX1 and/or to the first telephone EG1 by means of the message ABFR.

A connection signaling for the first telephone EG1 is then initiated from the first telephone EG1 or from the first exchange PBX1 to the second telephone EG2 by way of the connection TV. A call number RUNO2 assigned to the second telephone EG2 is used for addressing and/or network path control for the connection signaling. Connection signaling is referred to hereafter as CALL, being shown in the figure as an arrow pointing toward the second telephone EG2. The destination address—in this instance the call number RUNO2 of the second telephone EG2—is added as a subscript with address information transmitted in the connection signaling and of relevance in the context of the invention being given in parentheses as a parameter. According to the invention the first telephone EG1 also transmits the determined associated email address EMAIL1 of the first subscriber in addition to the call number RUNO1 of the first telephone EG1. The email address EMAIL1 is transmitted from the first telephone EG1 to the second telephone EG2 in particular with connection setup signaling from the first telephone EG1 or a subsequent signaling initiated by an inquiry message of the second telephone EG2. Transmission here takes place as a function of the underlying transmission system, for example in the D-channel or a subscriber to subscriber segment (so-called user to user signaling) of an ISDN connection or in a protocol element of a packet-oriented telephone connection by means of SIP (Session Initiation Protocol) of the IETF working group (IETF: Internet Engineering Task Force) or by means of the ITU-T recommendation H.323. Protocol elements already provided for the purpose can be used to transmit the call number RUNO1, these being transmitted to the called terminal anyway for example with a signaling by means of CLIP (Calling Line Identification Presentation).

Further to the incoming signaling the received second telephone EG2 and/or the second exchange PBX2 detects the data transmitted in the connection signaling CALL—in particular the call number RUNO1 and the email address EMAIL1—and stores the call number RUNO1 and the email address EMAIL1 with mutual assignment in the caller log CALLLOG after transmission SPE to the second database PBXDB2. An entry of this type is shown in the caller log CALLLOG in FIG. 2, with the column values for the columns DATE and NAME, and other caller log entries, only being shown by dots.

In the further course of time the second subscriber can accept the incoming call signaled by the connection setup signaling. Alternatively the first subscriber can terminate the incoming call, before the second subscriber has accepted the call. This distinction and further processing steps in the context of the call are of no further relevance with regard to the invention and are therefore not explained in more detail.

Transmission of the email address EMAIL1 in the context of the connection TV can take place in a special embodiment of the invention in a signaling segment actually provided for a different purpose, for example in the segment for transmitting a display name. It is possible in particular here for the start and end of the email address EMAIL1 to be marked in this signaling segment in such a manner that the email address EMAIL1 is identified by the second telephone EG2 from the marking and extracted, without the data structure actually provided for transmission in this segment being lost.

In a subsequent method step the second subscriber can initiate a callback to the first telephone EG1 by activating a callback functionality at the second telephone EG2. Alternatively a user action at the second telephone EG2 or at the second email client EM2 can prepare for an email transmission to the first email client EM1. The last-mentioned user action—for example pressing a button on the second telephone EG2 or activating a pushbutton or making a menu selection at a user interface at the second telephone EG2 or at the second email client EM2—initiates the reading out AUS of the previously stored entry relating to the call number RUNO1 and the email address EMAIL1 from the call log CALLLOG, with the address transfer unit AE of the second telephone EG2 transmitting the previously stored email address EMAIL1 assigned to the call number RUNO1 to the second email client EM2 by way of the CTI link CTIK (message USB in FIG. 1).

The second email client EM2 then opens an empty email window to compose an email, in which the determined email address EMAIL1 is input for the address field. After additional manual inputting of an email text as the data to be transmitted, the second subscriber can send the email to the first subscriber. When the second email client EM2 identifies the initiation of the email transmission, an email MAIL is then transmitted as an SMTP message to the first email client EM1 by way of the data network IPNW. Addressing here takes place by way of the input email address EMAIL1, which was originally transmitted in the connection signaling from the first telephone EG1 to the second telephone EG2. The address—in this instance EMAIL1—is again added as a subscript to the message—in this instance MAIL.

The second subscriber is able to transmit data to the first subscriber by way of an alternative communication path in the manner described above. This is particularly advantageous, if the second telephone EG2 or the second exchange PBX2 does not have access to the assignment table ZUORD. This is the case in conventional communication systems, if, as in the present exemplary embodiment, the first and second telephones EG1, EG2 are linked by way of a public or private telephone network, by way of which proprietary access to the assignment table ZUORD stored in the first database PBXDB1 is not possible.

The caller log CALLLOG is advantageously stored in the second exchange PBX2 or in the second telephone EG2 as a caller log or address book. Alternatively the call log can also be stored in an email address book of the second email client EM2. Further call-related data can also be stored in the caller log CALLLOG and this can then be inserted automatically into the email, for example in the subject line or in the email text, in addition to the email address. Transmission of an entry in the caller log CALLLOG to the email client EM2 can preferably be initiated by activating an entry in the caller log CALLLOG by displaying and selecting this entry at the second telephone EG2. To facilitate selection, similarly transmitted name information NAME of the first telephone EG1 is preferably also stored in the caller log CALLLOG and in some instances this is transmitted anyway to the called terminal in known signalings to show a display name to be displayed on a display unit.

It should be noted that in conventional communication systems a telephone connection is frequently switched by way of one or more exchanges. The direct transmission shown from the first telephone EG1 to the second telephone EG2 should therefore only be seen as a simplified abstraction. Similarly in FIG. 1 means for the CTI link and for email transmission and email storage—such as the use of email mailboxes and email servers for example—are not set out in more detail, as this is not deemed to be significant for an understanding of the invention.

FIG. 2 shows an alternative embodiment of the invention, with various components and method steps being identical to the embodiment in FIG. 1 and therefore not being described again. In contrast to FIG. 1 in FIG. 2 there is a link between the first primary service communication facility and the second primary service communication facility by way of an IP network IPNW. The first secondary service communication facility and the first primary service communication facility and the second secondary service communication facility and the second primary service communication facility are applications on a workplace computer. The first workplace computer PC1 here comprises in particular a telephone client TC1—generally configured as a so-called soft client—as a first primary service communication facility and a third email client EM3 as a first secondary service communication facility. The second subscriber is assigned a second workplace computer PC2, which comprises a second telephone client TC2 and a fourth email client EM4. Server facilities, which are required for a telephony application such as the telephone clients TC1 and TC2, are not shown in FIG. 2 for simplification purposes. The only server component shown is the LDAP database (LDAP: Lightweight Directory Access Protocol), which is located like the first workplace computer PC1 in a local network of the first subscriber. The LDAP database LDAP here holds the assignment table ZUORD known from FIG. 1, which is written and updated by means of a communication service present in the local network (not shown). The LDAP database LDAP in particular stores generally unmodifiable communication data—such as call numbers, email addresses, mail addresses—of many or all the subscribers in a company, department and/or organization. In particular a call number/email address value pair RUNO1-EMAIL1 is stored in the assignment table ZUORD, together with further entries shown by dots.

The second telephone client TC2 of the second workplace computer PC2 is linked to a call log database RDB, which comprises the caller log CALLLOG known from FIG. 1 and which, like the second telephone client TC2, is an integral component of the second workplace computer PC2. At the start of the method the caller log CALLLOG is empty or contains entries which are not significant for clarification of the method and are only shown by dots in FIG. 2.

The sequence of the invention is now the same as FIG. 1. Activated by the initiation of a connection and the dialing of the destination call number RUNO2 of the second telephone client TC2 at the first telephone client TC1, an interrogation message AM is sent to the LDAP database LDAP, in order to determine an email address EMAIL1 assigned to the call number RUNO1 of the first telephone client TC1. The telephone client TC1 then uses this determined email address EMAIL1 to set up a call setup signaling CALL to the second telephone client TC2 by way of the signaling path SIGPF, with in particular the call number RUNO1 of the calling telephone client TC1 and the assigned email address EMAIL1 determined from the LDAP database LDAP being transmitted. The second telephone client TC2 then stores the transmitted address data RUNO1 and EMAIL1 in the caller log CALLLOG of the call log database RDB. The address data RUNO1 and EMAIL1 is hereby transferred, in some instances together with further data, by means of the message traffic SPEL to the call log database RDB. The state of the caller log CALLLOG then corresponds to the state shown in FIG. 2 with a common data set for the call number RUNO1 and the email address EMAIL1—as well as further values only shown by dots for further data set fields and further data sets.

Some time after a user action at the second workplace computer PC2 can initiate the opening and displaying of an email text message at the fourth email client EM4, with the previously stored email address EMAIL1 being read out by interrogation ABSA from the call log CALLLOG and being transmitted to the fourth email client EM4 to fill in a destination address field of the email text message by means of an interprocess message INM of the second workplace computer PC2. The email text message is now available to the second subscriber for further processing at the fourth email client EM4. A user action at the fourth email client EM4 allows the email with the email address already filled in to be transmitted at a later time to the email address EMAIL1 inserted. In the present exemplary embodiment the user action causes the email text message to be transmitted to the first workplace computer PC1 and in particular to the third email client EM3 by means of a message MAIL by addressing to the destination email address EMAIL1. The first subscriber thus receives information from the originally called second subscriber in an alternative representation—text instead of voice—by way of an alternative transmission protocol—an email protocol such as SMTP instead of a voice protocol.

The method shown in FIG. 2 is particularly advantageous if the second workplace computer PC2 cannot access the LDAP database LDAP due to the network structure. This is the case particularly when the LDAP database LDAP is configured in a non-public address space (and therefore the second workplace computer PC2 cannot address the LDAP database LDAP) or is protected by a firewall against access from outside a local network. A link between the respective telephone client and email client of a workplace computer is preferably effected by way of interprocess communication. As an alternative or in addition to email transmission an instant messaging method can also be deployed as the secondary communication service.

As well as the arrangements illustrated in FIGS. 1 and 2, the invention cam also be deployed without restriction in further more complex system arrangements. For example a line-oriented ISDN telephone can be available to the sending subscriber as a first primary service communication facility and a WLAN-interfaced (WLAN: Wireless Local Area Network) PDA (Personal Digital Assistant) as a first secondary service communication facility, while an IP-based telephone is assigned to the second subscriber as a second primary service communication facility and a workplace computer connected to the internet by way of a LAN cable (LAN: Local Area Network) as a second secondary service communication facility. In an arrangement of this type provision should be made in particular for a transition between an ISDN-based and an IP-based telephone network and a transition from a line-based to a radio-based data network.

Depending on the implementation of the transmission of the secondary address information from the first primary service communication facility to the second primary service communication facility—for example by extending an existing signaling protocol or by other use of existing protocol elements, for which there is generally no provision—provision should possibly be made for simple protocol adjustments or conversions in the components in a signaling path for connection signaling, such as gateways, gatekeepers and/or exchanges for example.

In the figures the primary and secondary service communication facilities are terminals. However there is no restriction to terminals, as the method can also be deployed without modification on server facilities. For example automatic email messaging can be provided, being initiated by a server component as a second primary or secondary service communication facility based on the incoming connection signaling.

The invention can also be extended so that an email can be generated automatically with a situation-based email text, possibly influenced by predetermined rules. This can be used for example to notify the first subscriber automatically after expiry of a predetermined time period, that the second subscriber has not yet interrogated the call log or a voice message that may have been included during the time period and therefore has also not yet carried out any actions that may have been required by the first subscriber.

Also information about the previous connection signaling—for example the time when the connection signaling took place, whether the connection was not answered, or the connection was rejected due to a busy state, whether a message was left on the answering machine—can advantageously be included in the useful text for the transmission of data to the first subscriber by email or instant messaging message. This allows a semantic reference to be established to the previous connection attempt.

The invention claimed is:

1. A method for transmitting data to a first subscriber, comprising:
    assigning to the first subscriber a first primary service communication facility for communication via a primary communication service and a first secondary communication facility for communication via a secondary communication service;
    assigning primary address information to the first primary service communication facility and assigning secondary address information to the first secondary service communication facility, wherein in the context of a connection signaling via the primary communication service from the first primary service communication facility to a second primary service communication facility,
        the primary address information and the secondary address information are transmitted via the primary communication service during the connection signaling from the first primary service communication facility to the second primary service communication facility via the primary communication service, and
        the second primary service communication facility identifies the transmitted primary and secondary address information and stores them in an address book with mutual assignment;
    transferring the stored secondary address information from the second primary service communication facility to a second secondary service communication facility for a transmission of data to the first subscriber; and
    transmitting by the second secondary service communication facility, the data to be transmitted to the first subscriber via the secondary communication service to the first secondary service communication facility using the transferred secondary address information; and
    wherein address information for the second primary service communication facility is used for at least one of addressing and network path control for the connection signaling from the first primary service communication facility to the second primary service communication facility, and
    wherein the second primary service communication service receives the secondary address information without access to an assignment table of an exchange that identifies at least one of the primary address information of the first primary service communication facility and the secondary address information of the first secondary service communication facility.

2. The method as claimed in claim 1, wherein the primary communication service is provided for bidirectional voice, video and/or multimedia communication and/or the secondary communication service is provided for unidirectional message transmission via text, voice, video and/or multimedia data.

3. The method as claimed in claim 2, wherein the primary address information is represented by a call number or an IP (Internet Protocol) address and/or the secondary address information is represented by an email address.

4. The method as claimed in claim 3, wherein the first primary service communication facility determines the secondary address information by interrogating an exchange, a gatekeeper, a database or the first secondary service communication facility using the primary address information as an interrogation criterion.

5. The method as claimed in claim 4, wherein the second primary service communication facility stores the transmitted primary and secondary address information with assignment to name information of the first subscriber.

6. The method as claimed in claim 5, wherein, further to a user action at the second primary service communication facility or at the second secondary service communication facility, a text message with the stored secondary address information as a previously filled in destination address is displayed for further processing at the second primary service communication facility or at the second secondary service communication facility.

7. The method as claimed in claim 6, wherein the secondary address information transmitted in D-channel (delta channel) information elements or in a subscriber to subscriber signaling segment of the ISDN (Integrated Services Digital Network) protocol or in signaling messages of an IP-based protocol.

8. The method as claimed in claim 7, wherein the secondary address information is transmitted from the first primary service communication facility together with an initial connection setup signaling or initiated by an interrogation message from the second primary service communication facility in a subsequent connection setup signaling.

9. The method as claimed in claim 8, wherein the secondary address information is transmitted in a signaling segment actually provided for a different purpose and/or the secondary address information is marked such that the secondary address information is identified by the second primary service communication facility from the marking.

10. The method of claim 1 wherein the second primary service communication service receives the secondary address information without access to data from an access table of an exchange.

11. The method of claim 1, wherein the primary communication service for communications between the first primary service communication facility and the second primary service communication facility is associated with a first network and the secondary communication service for communications between first secondary service communication facility and the second secondary service communication facility is associated with a second network, and wherein the first network and the second network are different.

12. The method of claim 1, wherein the secondary address information is transmitted via the primary communication service during the connection signaling from the first primary service communication facility in a signaling segment for transmitting a display name.

13. The method of claim 1, further comprising a second subscriber accepting an incoming call signaled by the connection signaling from the first primary service communication facility to the second primary service communication facility via the primary communication service.

14. The method of claim 1, wherein the data to be transmitted to the first subscriber via the secondary communication service comprises an email, the method further comprising storing call-related data and inserting the call-related data into the email.

15. A communication system for transmitting data to a first subscriber, comprising:
a first primary service communication facility assigning device that assigns to the first subscriber a first primary service communication facility for communication via a primary communication service and a first secondary communication facility for communication via a secondary communication service;
a primary address information assigning device that assigns primary address information to the first primary service communication facility and assigns secondary address information to the first secondary service communication facility,
wherein in the context of a connection signaling via the primary communication service from the first primary service communication facility to a second primary service communication facility,
the primary address information and the secondary address information are transmitted via the primary communication service during the connection signaling from the first primary service communication facility to the second primary service communication facility via the primary communication service, and
the second primary service communication facility identifies the transmitted primary and secondary address information and stores them in an address book with mutual assignment;
a stored secondary address information transferring device that transfers the stored secondary address information from the second primary service communication facility to a second secondary service communication facility for a transmission of data to the first subscriber; and
a data transmission device that transmits the data to be transmitted to the first subscriber via the secondary communication service to the first secondary service communication facility using the transferred secondary address information; and
wherein address information for the second primary service communication facility is used for at least one of addressing and network path control for the connection signaling from the first primary service communication facility to the second primary service communication facility, and
wherein the second primary service communication service receives the secondary address information without access to an assignment table of an exchange that identifies at least one of the primary address information of the first primary service communication facility and the secondary address information of the first secondary service communication facility.

16. The communication system of claim 15 wherein the second primary service communication facility receives the secondary address information without access to an assignment table of an exchange that identifies the secondary address information of the first secondary service communication facility.

17. A communication terminal for transmitting data to a first subscriber, where a first primary service communication facility for communication by way of a primary communication service and a first secondary communication facility for communication by way of a secondary communication service are assigned to the first subscriber and primary address information is assigned to the first primary service communication facility and secondary address information is assigned to the first secondary service communication facility, comprising:

- a telephone receive unit that receives a connection signal from the first primary service communication facility with the primary address information and the secondary address information being transmitted in the context of the connection signaling via the primary communication service during the connection signaling from the first primary service communication facility to the second primary service communication facility via the primary communication service;
- a telephone identification unit to identify the primary and secondary address information received by the receive unit;
- a telephone storage control unit for the storage with mutual assignment of the primary and secondary address information identified by the identification unit in an address book; and
- a telephone address transfer unit to transfer the secondary address information stored by the storage control unit to a second secondary service communication facility configured to transmit the data to be transmitted to the first subscriber via the secondary communication service to the first secondary service communication facility using the transferred secondary address information; and
- wherein address information for the second primary service communication facility is used for at least one of addressing and network path control for the connection signaling from the first primary service communication facility to the second primary service communication facility, and
- wherein the second primary service communication service receives the secondary address information without access to an assignment table of an exchange that identifies at least one of the primary address information of the first primary service communication facility and the secondary address information of the first secondary service communication facility.

18. The communication terminal of claim 17 wherein the communication terminal receives the secondary address information via the primary communication service without access to an assignment table of an exchange.

* * * * *